United States Patent
Zhu et al.

(10) Patent No.: US 7,044,473 B1
(45) Date of Patent: May 16, 2006

(54) PISTON AND PISTON RING ASSEMBLY

(76) Inventors: Zhihong Zhu, The policy Research Department 233 Zhongyuanxi Road, 450007 Zhengzhou City, Henan Province (CN); Baodong Wang, Group 16, Taipingdian Village, Heshangquiao Town, 461500 Changge City, Henan Province (CN)

( * ) Notice: Subject to any disclaimer, the term of this patent is extended or adjusted under 35 U.S.C. 154(b) by 0 days.

(21) Appl. No.: 09/979,867

(22) PCT Filed: Jun. 6, 2000

(86) PCT No.: PCT/CN00/00143

§ 371 (c)(1),
(2), (4) Date: Nov. 28, 2001

(87) PCT Pub. No.: WO00/75501

PCT Pub. Date: Dec. 14, 2000

(30) Foreign Application Priority Data

Jun. 8, 1999 (CN) .......................................... 99228551
Apr. 11, 2000 (CN) .......................................... 00209068

(51) Int. Cl.
*F02F 5/00* (2006.01)
*F16J 9/12* (2006.01)

(52) U.S. Cl. .................... 277/459; 277/434; 277/449; 277/460

(58) Field of Classification Search ................. 277/434, 277/449, 458, 459, 460
See application file for complete search history.

(56) References Cited

U.S. PATENT DOCUMENTS

| 1,368,447 | A | * | 2/1921 | Megson | 277/452 |
| 1,534,766 | A | * | 4/1925 | Briney | 277/460 |
| 1,547,917 | A | * | 7/1925 | Holverson | 277/460 |
| 2,056,099 | A | * | 9/1936 | Grimm | 277/447 |
| 6,113,107 | A | * | 9/2000 | Wang et al. | 277/434 |

* cited by examiner

*Primary Examiner*—Anthony Knight
*Assistant Examiner*—Enoch E Peavey
(74) *Attorney, Agent, or Firm*—Drummond & Duckworth

(57) ABSTRACT

Two seal rings are provided comprising an upper ring and a lower ring, the rings having a common axis, a common outer cylindrical surface, a common inner cylindrical surface, and a couple of facing surfaces. The facing surfaces form an engaging length in a radial section of the rings having a radially outer end and a radially inner end, and the facing surfaces and the common cylindrical surface define a first wedge-shaped gap with a radially inward leading edge at the outer end. The inward leading edge is provided with a first angle in a range of 10 seconds to 1 degree and 30 seconds, and the outer end is spaced more from the common cylindrical surface than from the common cylindrical inner surface.

7 Claims, 6 Drawing Sheets

US 7,044,473 B1

PISTON AND PISTON RING ASSEMBLY

RELATED APPLICATIONS

The present application is a national phase application of International Application No. PCT/CN00/00143 filed on Jun. 6, 2000, which, in turn derived from Chinese application Serial No. 00209068.6, filed Apr. 11, 2000, which is a continuation application of Chinese application Serial No. 99228551.8, filed Jun. 8, 1999. A chain of codependency exists such that the effective filing date of the instant application is Jun. 8, 1999.

TECHNICAL FIELD

The present invention relates to a piston and a piston ring.

RELATED ART

There is a conventional piston comprising a couple of seal rings including an upper ring and a lower ring. The piston reciprocates up and down in a cylinder having a cylindrical wall, on which the rings slide while being lubricated by oil. As the lower ring slides down, it scrapes or wipes from the wall some of the oil that accumulates under the outer lower edge of the lower ring and builds up a high pressure. In the meanwhile, an annular gap is generated between the lower annular side surface of the lower ring and the upper annular wall of a ring groove formed in the piston for receiving the upper and lower rings. A combustion chamber is usually provided between the top of the piston and the cylinder. The accumulated oil is squeezed under the high pressure into the combustion chamber through the annular gap and a back gap provided between the inner cylindrical surface of the rings and the bottom of the groove. Thus, the oil is burnt out in the chamber, which pollutes the atmosphere in addition to a waste of oil.

SUMMARY OF THE INVENTION

Therefore, an object of the invention is to provide a couple of seal rings having a better performance for sealing combustion gas and oil.

Another object of the invention is to provide a couple of seal rings for releasing a built-up pressure in scraped oil.

According to an aspect of the present invention, there is provided a couple of seal rings comprising an upper ring and a lower ring, the rings having a common axis, a common outer cylindrical surface, a common inner cylindrical surface, and a couple of facing surfaces, wherein the facing surfaces form an engaging length in a radial section of the rings having a radially outer end and a radially inner end, and the facing surfaces and the common cylindrical surface define a first wedge-shaped gap with a radially inward leading edge at the outer end, the inward leading edge being provided with a first angle in a range of 10 seconds to 1 degree and 30 seconds, and the outer end is spaced more from the common cylindrical surface than from the common cylindrical inner surface.

According to another aspect of the present invention, there is provided a piston comprising a top facing a combustion chamber, an outer cylindrical surface, a central axis defined by the cylindrical surface, and a ring groove recessed radially under the cylindrical surface, provided with an annular wall facing the top of the piston and used for receiving a seal ring having an annular side surface faced closely on the annular wall of the groove, wherein the seal ring, the piston and the outer cylindrical surface define an annular cavity disposed across a plane defined by the side surface of the ring, with the cavity recessed radially at the inner one of the circumferential intersections of the plane and the cavity.

DETAILED DESCRIPTION OF THE EMBODIMENTS

Figure 1:
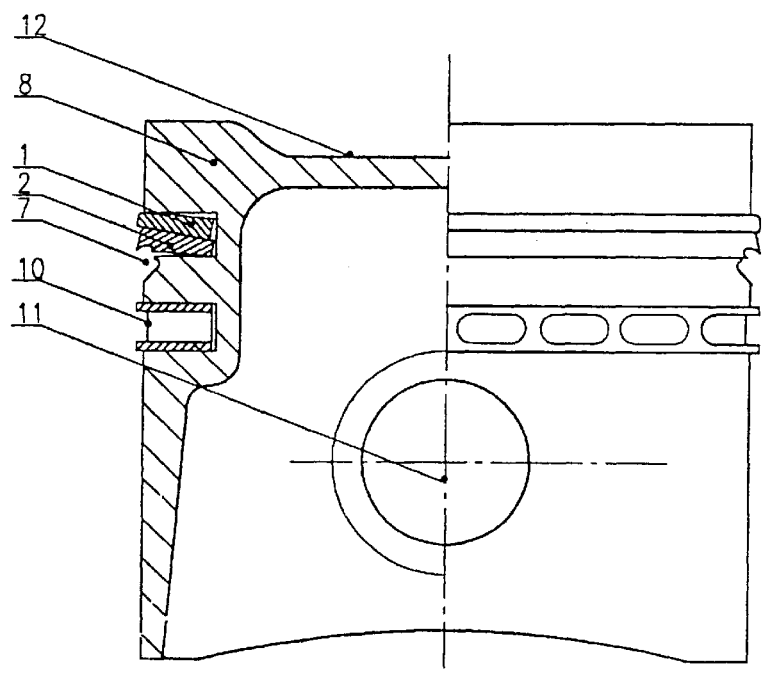
FIG. 1 shows an axial section of a piston provided in a ring groove with a couple of seal rings according to the present invention.
Figure 2:
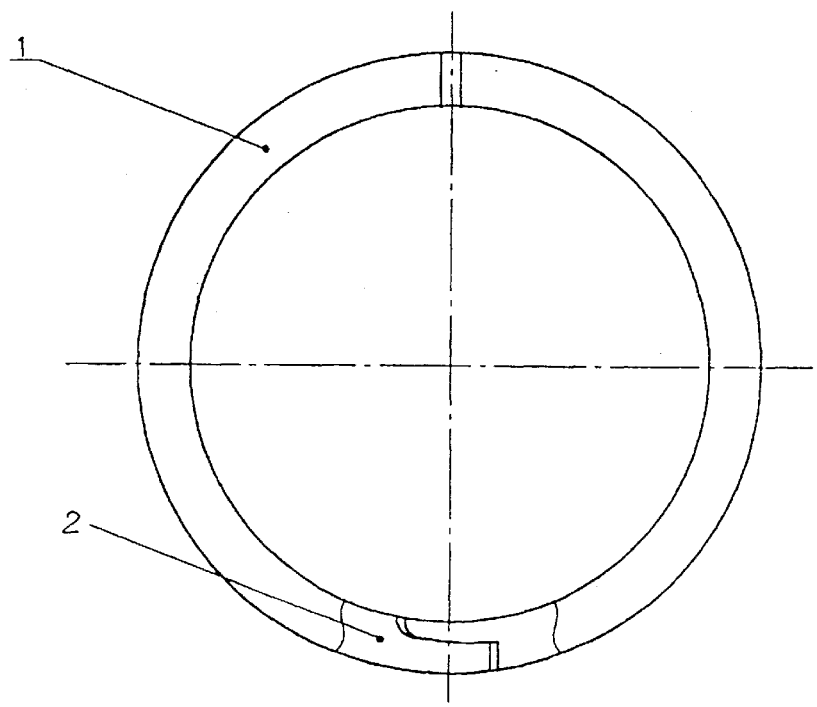
FIG. 2 shows a top view of an arrangement of the seal rings of FIG. 1.
Figure 3:
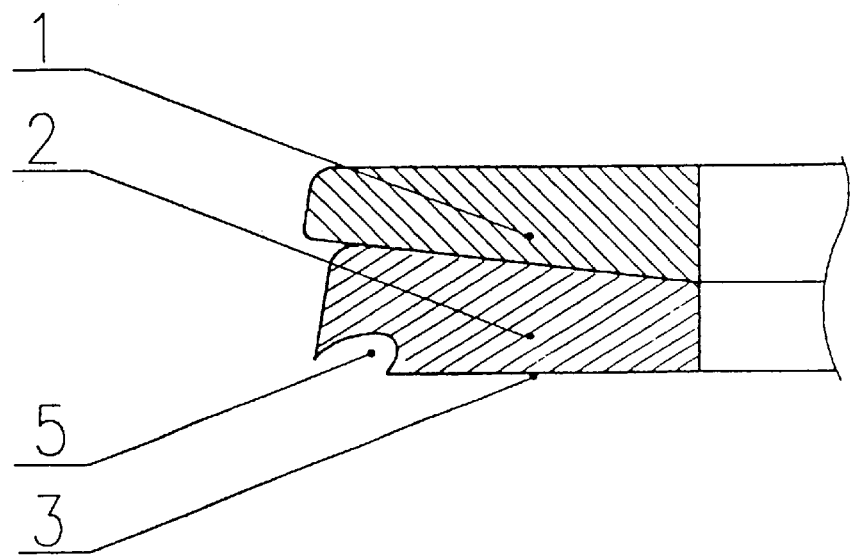
FIG. 3 shows a radial section of the rings of FIG. 1.
Figure 4:
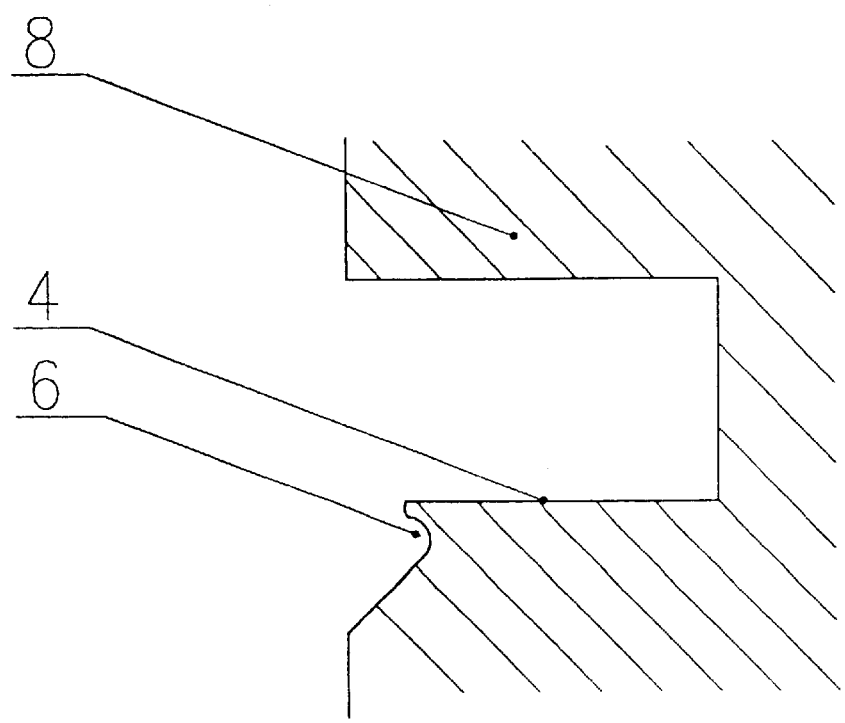
FIG. 4 shows a partially broken away section of the piston of FIG. 1 adjacent the ring groove.
Figure 5:
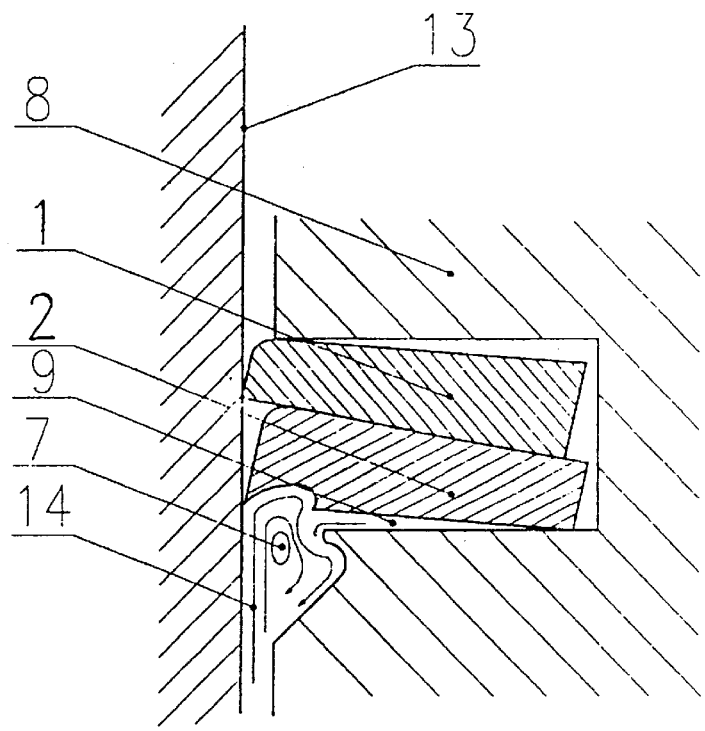
FIG. 5 shows a downward movement of the piston of FIG. 1 in a cylinder, with a cavity defined for accumulating oil.
Figure 6:
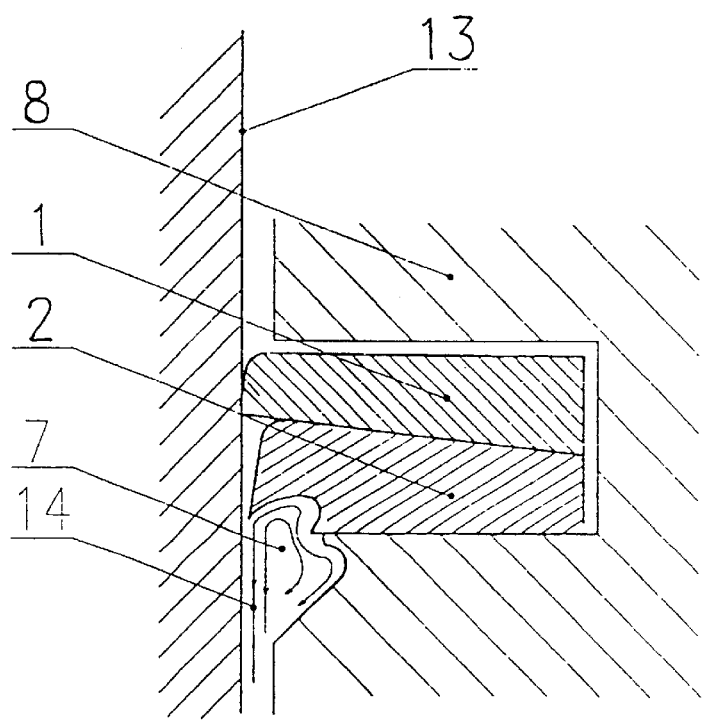
FIG. 6 shows a movement of the piston opposite to that of FIG. 5, illustrating a flowing status of the accumulated oil.

FIG. 1 shows an embodiment according to the present invention, comprising a piston 8 including a first ring groove for receiving a couple of gas-seal upper and lower rings 1 and 2 and a second ring groove for receiving an oil-seal ring 10. The upper ring 1 has a rectangular cutout, while the lower ring 2 has a radially stepped cutout, and they are so arranged side by side that their cutouts are disposed diametrically opposite to each other (as shown in FIG. 2). As shown in FIG. 3, the lower ring 2 has an underside including a radially outer portion formed with a nose-shaped notch 5, while the first groove having a lower wall including a radially outer portion formed with another nose-shaped notch 6 as shown in FIG. 4, with the notches 5 and 6 defining an annular cavity 7 for accumulating a lubricant or oil and releasing a pressure built up in the accumulated oil. As shown in FIG. 5, the piston reciprocates up and down in a cylinder, which defines a combustion chamber above the top of the piston. Specifically, the lower ring 2 has an outer lower edge, which scrapes or wipes oil from a cylindrical wall of the cylinder as the piston moves down. The scraped oil flows into the cavity 7 as shown, while a lateral gap 9 is generated between the underside of the lower ring 2 and the lower wall of the groove. As the cavity is recessed adjacent the lower wall surface of the first groove or the lateral gap, or it has a narrower section at the apex of the recess, the pressure is so distributed in the cavity that the notch 5 of the lower ring 2 contains a higher pressure than the notch 6 formed in the piston 8. As the scraped oil flows through the narrowed section of the cavity under the differential pressure from the notch 5 to the notch 6, the lateral gap 9 is provided with a vacuum pressure that sucks from the lateral gap 9 the oil accumulated therein so as to prevent the oil from running into the combustion chamber. On the other hand, the cavity is designed to have a sufficient volume for freely accumulating any oil as scraped potentially, so that there is not a high pressure built up in the cavity 7. Thus, the scraped oil will be not forced into the combustion chamber through the gaps bypassing the rings in the groove. As a result, the present invention is provided with a decreased waste of oil and a reduced pollution. As shown in FIG. 6, as the piston moves up, the oil accumulated in the cavity 7 dissipates or carries away heat from the lower ring 2 and the piston 8 and is meanwhile released evenly onto the wall 13 of the cylinder, establishing a uniform lubricating film and a heat-exchanging media. Consequently, the present invention is provided with another advantage for a better lubrication and a reduced temperature in the rings and the piston.

Advantageously, the lower ring 2 includes a first peninsula which extends into tile cavity 7 along the plane defined by the ring seal's lower surface 3. As best shown in FIG. 3, the ring seal's peninsula is formed by projection of its lower surface 3 into the notch 5 which forms a portion of the cavity 7. Moreover, the piston includes a second peninsula extending into the cavity 7 along the same plane defined by the piston's surface 4. With reference to FIG. 4, the piston's second peninsula is formed by projection of the surface 4 into the notch 6 which forms a portion of the cavity 7. This construction provides sufficient volume to provide the accumulation of oil without a buildup of high pressure.

In a prior technical solution, a piston is provided with a couple of conventional seal rings. Because of a limited interface for heat exchange, the rings are subject to a high temperature and a poor lubrication so that they would be worn out frequently.

It will be appreciated the present invention is provided with a reduced friction between the cylinder wall and the seal rings and a reduced consumption of oil and gasoline, and hence a substantially more efficient dynamic performance.

Figure 7:
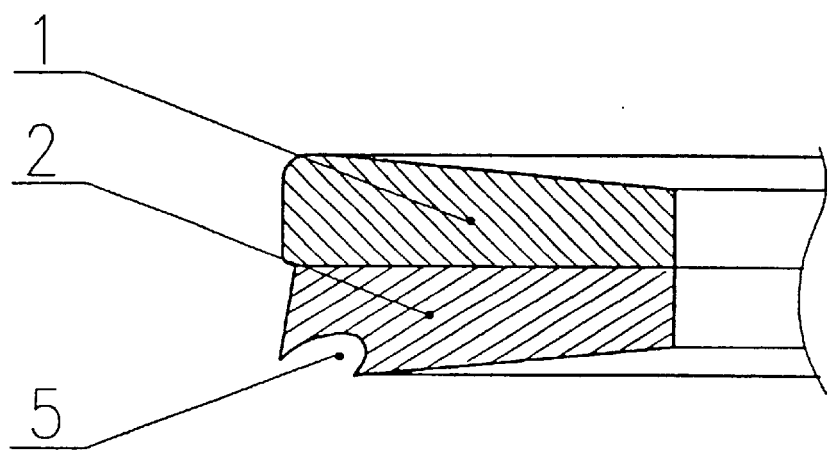
FIGS. 7 and 8 show further embodiments of the present invention.
Figure 8:
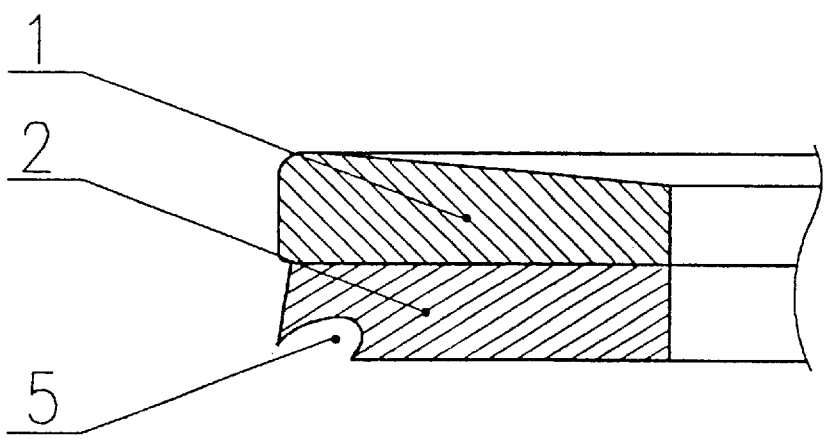
Figure 9:
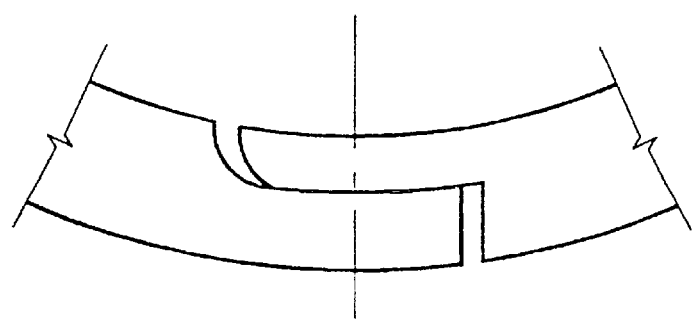
FIG. 9 shows a preferred embodiment of FIG. 2.

Other embodiments of the present invention may comprise upper and lower rings 1 and 2 each of which constitutes a trapezoidal radial section (as shown in FIG. 7), or one of which is rectangular and the other is trapezoidal (as shown in FIG. 8).

As the present invention provides an efficient heat dissipation or transfer from the piston and the seal rings and a better lubrication between the rings and the cylinder wall, the present rings have a life twice as long as that of a conventional one.

Further preferred embodiments of the present invention will be described in detail as follows.

Figure 10:
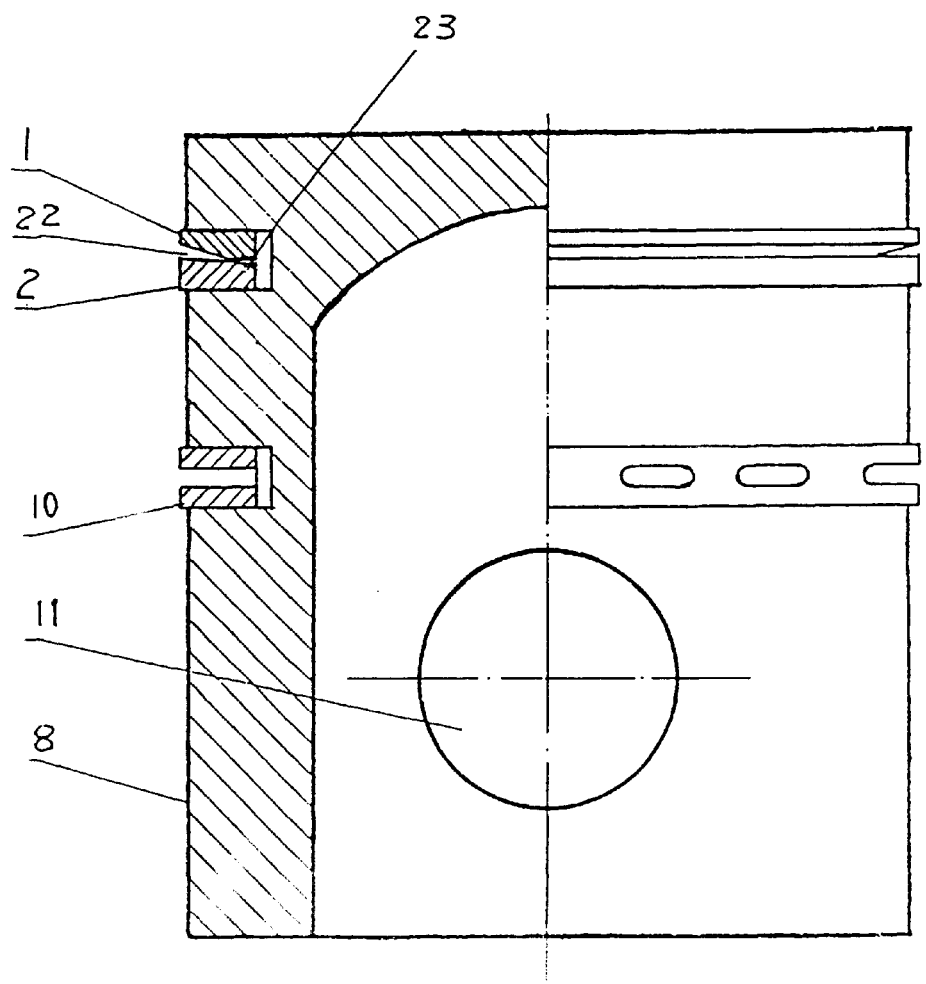
FIG. 10 shows another embodiment according to the present invention.

As shown in FIG. 10, a piston is provided with a couple of gas-seal rings and an oil-seal ring. The gas-seal rings are received in a first groove formed in the piston, with their cutouts being arranged diametrically opposite to each other and staggered away from a pin 11 of the piston.

Figure 11:
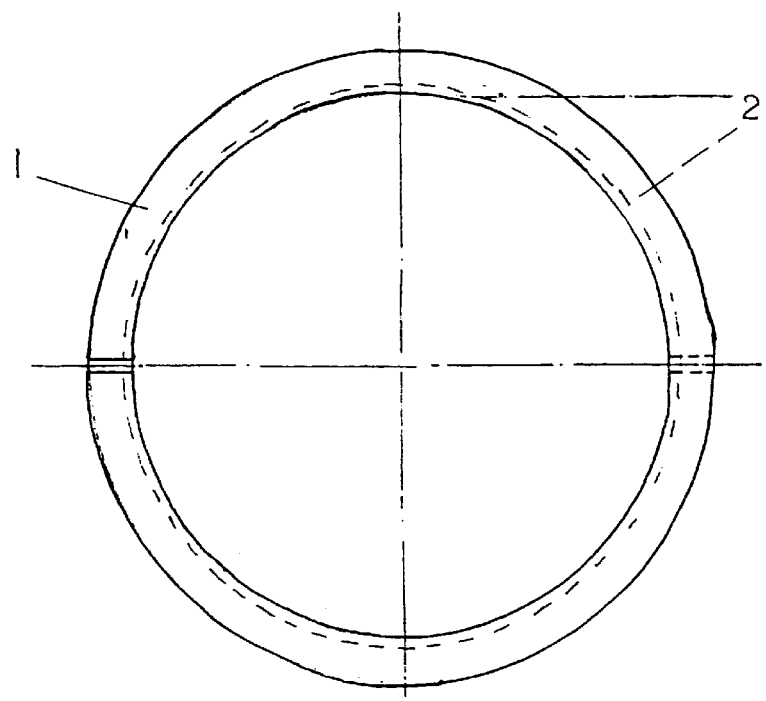
FIG. 11 shows a preferred arrangement of seal rings.
Figure 12:
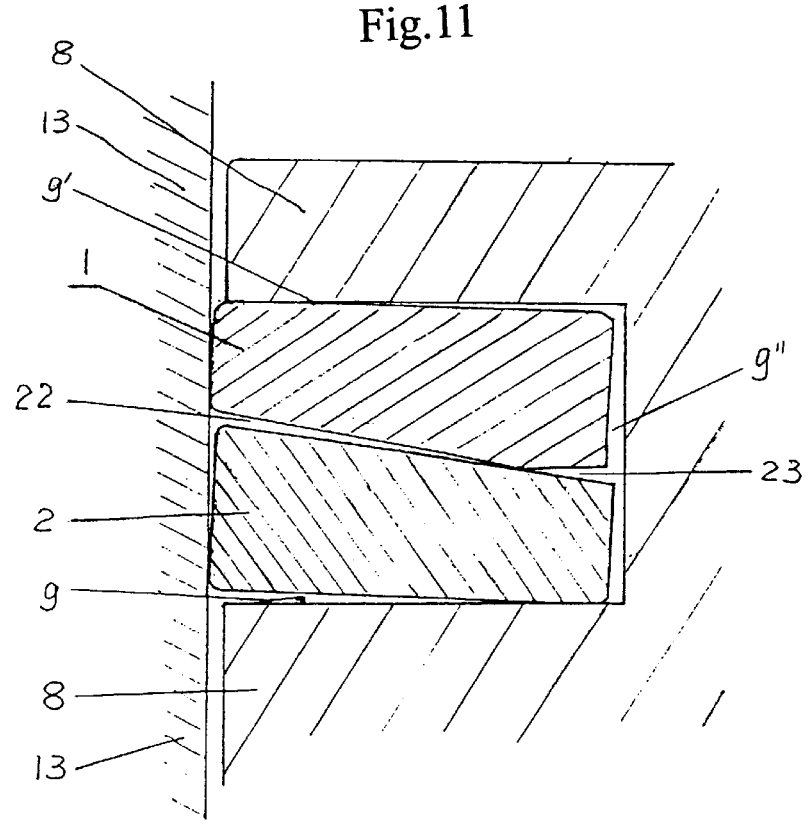
FIG. 12 shows a partially broken away section of FIG. 10 illustrating an operation of the embodiment.

As shown in FIG. 11, this embodiment is provided with a couple of gas-seal rings comprising an upper ring 1 and a lower ring 2, both of which constitute a rectangular radial section when assembled onto a piston. It is preferable that a wedge-shaped gap is formed between the rings radially inward from their outer cylindrical surfaces, with an angle in a range of 10 seconds-1 degree and 30 seconds. It is more preferable that such an angle is in a range of 30 seconds-1 degree and 30 seconds or 10 seconds-1 degree.

On the other hand, it is still preferable that another wedge-shaped gap is formed between the rings radially outward from their inner cylindrical surfaces, with an angle in a range of 2 degrees-7 degrees and 30 seconds, more preferably 2–6 degrees. Thus, there are two wedge-shaped gaps 22 and 23 in a radial section of the rings, with their acute apexes being pointed radially to each other. The radially outer gap has a greater radial length than the inner one. It is preferable that the former is 10 times as radially long as the latter or longer.

Furthermore, in order to allow the upper and the lower rings to pivot somewhat against each other, there is a pivot provided between the acute apexes. Obviously, the pivot is radially nearer to the inner cylindrical surface of the rings than the outer one.

Another embodiment of the present invention comprises an upper ring 1 constituting a polygonal radial section and a lower ring 2 assuming a rectangular radial section. There is another annular gap 9' provided between the upper side surface of the upper ring and the upper wall of the groove, and a back gap 9" formed between the rings and the radial bottom of the groove.

In an engine according to the present invention, the present piston and seal rings operate in the following manner:

In an inhaling stroke, as the piston returns from a top dead point of a working stroke at the conclusion of an exhaust stroke, the piston moves towards a bottom dead point thereof, while the upper ring 1 squeezes out the deposited carbon from the gap 9'. At the same time, the upper side surface of the upper ring and the lower side surface of the lower ring, being engaged with the upper and lower walls of the groove, form sealing means for blocking any substantial oil flow into the back gap 9" from the lateral gap 9. In the present stroke, the seal rings and the ring groove automatically form a sealing means for blocking any leakage of combustion gas from the combustion chamber and oil into the chamber.

In a compressing stroke, the piston moves from the bottom dead point to the top dead point, after the inhaling stroke is completed, while the lower ring 2 squeezes oil outward radially to the cylinder wall from the lateral gap 9. The lower side surface of the lower ring 2 and the lower wall of the groove are urged against each other to form a sealing means, while the radially inner upper edge of the upper ring 1 is urged against the upper wall of the groove to form another sealing means, with those sealing means cutting off any substantial leakage of air compressed in the chamber.

In a power stroke, after the compressing stroke is finished, the piston moves down from the top dead point to the bottom dead point. As a mixture of air and gasoline is ignited in the combustion chamber, there is a sharply increased pressure in the chamber, which applies onto the top of the piston and the upper side surface of the upper ring. This certainly results in a high pressure in the back gap 9", which urges the upper ring against the cylinder wall to prevent the ring from floating or vibrating, avoiding any substantial leakage of combustion gas.

In an exhaust stroke, after the power stroke is ended, as the piston moves up from the bottom dead point to the top dead point, the rings operate in the same manner as in the compressing stroke.

It is obvious from the above illustration of those strokes that as there is a clearance provided respectively between the groove walls and the seal rings, the upper and lower rings 1 and 2 is movable with respect to the piston or the groove to form sealing means for presenting any substantial leakage of oil into the chamber and gas therefrom. Furthermore, the present rings will have a long life and an excellent performance.

What is claimed is:

1. A couple of seal rings comprising an upper ring and a lower ring, the rings having a common axis, a common outer cylindrical surface, a common inner cylindrical surface, and a couple of facing surfaces, wherein the facing surfaces form an engaging length in a radial section of the rings having a radially outer end and a radially inner end, and the facing surfaces and the common outer cylindrical surface define a first wedge-shaped gap with a radially inward leading edge at the outer end, and the outer end is spaced more from the common outer cylindrical surface than from the common cylindrical inner surface, and wherein the facing surfaces defines a second edge-shaped gap with a radially outward leading edge at the inner end.

2. A couple of seal rings according to claim 1, wherein the facing surfaces defines a second edge-shaped gap with a radially outward leading edge at the inner end, the outward leading edge being provided with a second angle in a range of 2 degrees to 7 degrees and 30 seconds.

3. A couple of seal rings according to claim 2, wherein the first angle is in a range of 10 seconds to 1 degree.

4. A couple of seal rings according to claim 2, wherein the second angle is in a range of 2–6 degrees.

5. A couple of seal rings according to claim 1, wherein the first gap has a radial length 10 times as great as that of the second gap or greater.

6. A piston comprising a top facing a combustion chamber, an outer cylindrical surface, a central axis defined by the cylindrical surface, and a ring groove recessed radially under the cylindrical surface, provided with an annular wall facing the top of the piston and used for receiving a seal ring having an annular side surface faced closely on the annular wall of the groove and defining a plane, wherein the seal ring, the piston and the outer cylindrical surface define an annular cavity, and the ring formed with a first peninsula extended into the cavity along the plane and the piston formed a second peninsula extended into the cavity along the plane.

7. A piston according to claim 6, wherein the first peninsula has a radial length greater than that of the second peninsula.

* * * * *